United States Patent
Kao

(10) Patent No.: US 8,249,143 B2
(45) Date of Patent: Aug. 21, 2012

(54) SYSTEM AND METHOD FOR ALLOCATING BITSTREAM OF SCALABLE VIDEO CODING

(75) Inventor: Jung-Yang Kao, Pingtung County (TW)

(73) Assignee: Industrial Technology Research Institute, Hsinchu (TW)

( * ) Notice: Subject to any disclaimer, the term of this patent is extended or adjusted under 35 U.S.C. 154(b) by 1105 days.

(21) Appl. No.: 12/128,621

(22) Filed: May 29, 2008

(65) Prior Publication Data

US 2009/0207916 A1 Aug. 20, 2009

(30) Foreign Application Priority Data

Feb. 19, 2008 (TW) .............................. 97105780 A

(51) Int. Cl.
*H04N 7/12* (2006.01)
(52) U.S. Cl. .................................................. 375/240.01
(58) Field of Classification Search ........................ None
See application file for complete search history.

(56) References Cited

U.S. PATENT DOCUMENTS

| | | |
|---|---|---|
| 2003/0195977 A1 | 10/2003 | Liu et al. |
| 2006/0013309 A1 * | 1/2006 | Ha et al. .................. 375/240.16 |
| 2007/0086515 A1 | 4/2007 | Kirkenko et al. |

FOREIGN PATENT DOCUMENTS

| | | |
|---|---|---|
| CN | 1581976 | 2/2005 |
| CN | 1909662 | 2/2007 |
| TW | 200706006 | 2/2007 |
| TW | 200737982 | 10/2007 |

OTHER PUBLICATIONS

Amonou, et al., "Optimized Rate-Distortion Extraction with Quality Layers", Image Processing of IEEE International Conference, Oct. 2006, pp. 173-176.
"First Office Action of China Counterpart Application", issued on Sep. 13, 2010, p. 1-p. 5, in which the listed references were cited.
"Office Action of Taiwan Counterpart Application", issued on Jan. 31, 2012, p. 1-p. 5, in which the listed references were cited.

\* cited by examiner

*Primary Examiner* — Kevin C Harper
(74) *Attorney, Agent, or Firm* — Jianq Chyun IP Office

(57) ABSTRACT

The present invention provides a system for allocating a bitstream of scalable video coding (SVC). The system includes an adapter and an extractor. The adapter is employed for receiving a bitstream produced by a video encoder and producing an extracting parameter of the bitstream according to the feature of a bitstream parameter in the bitstream content. The extractor is employed for extracting and allocating the bitstream according to the above-mentioned extracting parameter. In this way, the present invention is able to achieve the maximum usage efficiency of bandwidth and the optimum frame quality.

14 Claims, 3 Drawing Sheets

SYSTEM AND METHOD FOR ALLOCATING BITSTREAM OF SCALABLE VIDEO CODING

CROSS-REFERENCE TO RELATED APPLICATION

This application claims the priority benefit of Taiwan application serial no. 97105780, filed on Feb. 19, 2008. The entirety of the above-mentioned patent application is hereby incorporated by reference herein and made a part of specification.

BACKGROUND OF THE INVENTION

1. Field of the Invention

The present invention relates to a system and a method for allocating a bitstream of scalable video coding (SVC).

2. Description of Related Art

In the development stream of the video coding, currently the SVC is considered as the video compression standard for the next age. Meanwhile, the SVC is also considered as the first video compression standard today to make the SVC framework normative. It is curtained that the video compression technology proceeds towards a hierarchical scalability and bitstream scalability in future. Once various future video compression standards with the scalability feature were launched, it would be seen that a reasonable mechanism capable of assigning bitstream between each layer within each video compression standard is the vital key for the standard to be survived.

In terms of the current SVC standards, after an extractor extracts a compressed bitstream, three types of bitstream amounts can be adjusted and accommodated: frame rate (temporal scalability), frame resolution (spatial scalability) and frame quality (SNR scalability, i.e., signal-to-noise rate scalability). In addition, the above-mentioned three types of bitstream amounts are allocated in uniform mode, which means the bitstream with the three properties is extracted in bracketed cutting-off manner to achieve the goal of lowering the required bitstream amount according to the conventional SVC standard. However, the above-mentioned approach is disadvantageous in causing an unstable image quality and reducing the bandwidth usage efficiency, since a bracketed cutting-off manner applied to each frame with different complexities would degrade the quality of a frame with high complexity, while enhance the quality of a frame with low complexity not significantly which is equivalent to wasting bitstream amount, nevertheless.

Based on the above-described situation, I. Amonou et al. disclosed a new method in the paper "*Optimized rate-distortion extraction with quality layers*," (I. Amonou, N. Cammas, S. Kervadec, S. Pateux, The Image Processing of IEEE International Conference, October 2006). With the method proposed by I. Amonou et al, the scalability of a quality layer is planned by using the R-D optimization (rate-distortion optimization). In other words, the optimum solution is obtained by adjusting the SNR of a bitstream and using Lagranian algorithm, wherein different bandwidths are chosen to extract the SNR characteristics in the bitstream according to the total bandwidth and the complexities of different frames therein, so as to achieve better frame quality.

However, the paper only focuses on the quality layer of a video bitstream for adjusting without considering the adjustments and allocations regarding temporal performance and spatial performance; plus, the paper does not involve the adjustment and allocation in the case where the three parameters (temporal parameter, spatial parameter and SNR parameter) are dynamically and mutually used.

SUMMARY OF THE INVENTION

Accordingly, the present invention is directed to a system and a method for allocating a bitstream of scalable video coding (SVC) so as to effectively and dynamically adjust and allocate the bitstream.

The present invention provides a system for allocating an SVC bitstream. The system includes an adapter and an extractor. The adapter is for receiving a bitstream of a video encoder and producing an extracting parameter according to the feature of the bitstream parameters in the bitstream content. The extractor is for extracting and allocating the bitstream according to the extracting parameter.

The present invention also provides a method for allocating an SVC bitstream. The method includes the following steps. First, a bitstream is received, wherein the bitstream has a plurality of frames and each frame has at least a bitstream parameter. Next, the complexity of each frame is analysed according to the features of the bitstream parameters. Next, a bitstream amount is allocated to each frame according to the complexity of the frame.

The present invention is able to allocate a different bitstream amount respectively to each frame according to the detection results after detecting the features of the bitstream parameters.

BRIEF DESCRIPTION OF THE DRAWINGS

Other objectives, features and advantages of the present invention will be further understood from the further technological features disclosed by the embodiments of the present invention wherein there are shown and described preferred embodiments of this invention, simply by way of illustration of modes best suited to carry out the invention.

DESCRIPTION OF THE EMBODIMENTS

Figure 1:
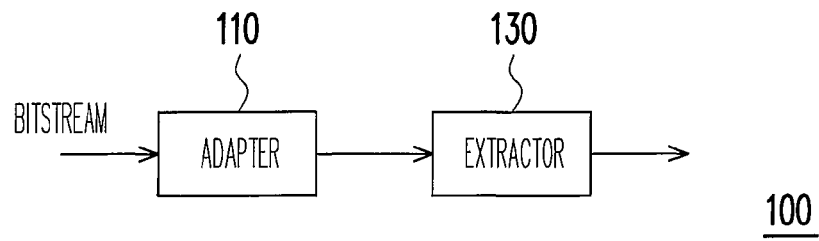
FIG. 1 is a block diagram of a system for allocating an SVC bitstream according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a block diagram of a system for allocating an SVC bitstream according to an embodiment of the present invention. Referring to FIG. 1, a bitstream allocation system 100 includes an adapter 110 and an extractor 130. The adapter 110 is employed for receiving a bitstream of a video encoder and producing an extracting parameter of the bitstream according to the features of the bitstream parameters in the bitstream content. The extractor 130 is employed for extracting and the allocating the bitstream according to the above-mentioned extracting parameter.

Figure 2:
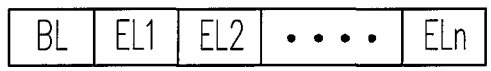
FIG. 2 is a diagram showing a multi-layers architecture in a bitstream according to an embodiment of the present invention.

In the embodiment, the above-mentioned bitstream has a plurality of frames, and the above-mentioned frames compose at least a group of picture GOP. The bitstream can further include a multi-layers architecture, as shown in FIG. 2, where, for example, there are a base layer BL, a first enhancement layer EL1, a second enhancement layer EL2 . . . , until a n-th enhancement layer ELn, wherein n is a positive integer. The number of the enhancement layers is varied depending on the video compression format. Each layer (base layer BL and enhancement layers EL1-ELn) can have a different resolution, a different frame rate or a different quality (i.e. a different SNR), so that each of the layers includes different bitstream parameters to indicate a different complexity of the frame.

In general, the base layer BL has at least the lowest resolution or the lowest frame rate; therefore, during the video transmission, at least the base layer BL in the bitstream must be transmitted so as to facilitate decoding the bitstream to reconstruct the video frame in its original state. In addition, when a bitstream includes both a base layer BL and enhancement layers, the bitstream would have a higher resolution or a higher frame rate. Particularly, more the number of the enhancement layers in addition to a base layer BL, the higher the corresponding frame quality is.

In the embodiment, the bitstream parameters which the above-mentioned adapter 110 works accordingly can be one of a quantification parameter QP, a block size BS or a motion vector MV, wherein the quantification parameter corresponds to the SNR scalability, the block size corresponds to the spatial scalability and the motion vector corresponds to the temporal scalability.

In the following, the procedure of dynamically allocating a bitstream according to the present embodiment is depicted in detail, wherein the bitstream parameter is, for example, assumed to be a quantification parameter. First, when the adapter 110 reveals the value of the quantification parameter in a frame (for example, sky frame) is large, it indicates the frame was encoded in consideration of a relatively monotonous frame before, so that a produced extracting parameter would control the extractor 130 to allocate a lower bit-rate, for example, a bit-rate merely able to analyse the quantification parameter and suitable for the base layer BL to the frame, while the rest bit-rate is reserved to allocate to other layers, i.e., the enhancement layers EL1-ELn, so as to provide other frames requiring a larger bit-rate with the reserved bit-rate to facilitate achieving the optimum frame quality.

In other words, if the adapter 110 has revealed by detection the quantification parameter in the frame (for example, a human face frame) is relatively small, it indicates the frame was considered as a relatively complex frame for encoding the frame before. Accordingly, an extracting parameter to be produced must be able to control the extractor 130 to allocate a larger bit-rate to the frame, and if the ready bit-rate is not sufficient, the surplus bit-rates initially assigned to other layers allow to be transferred. In this way, the frame after the allocation has a sufficient bit-rate competent not only for analysing the quantification parameter and suiting the base layer BL, but also for analysing the enhancement layers El1-ELn.

On the other hand, assuming the bitstream has a parameter of, for example, block size, if the adapter 110 has revealed by detection the block size in the frame (for example, a sky frame) is relatively large, it indicates the frame was considered as a frame with a lower resolution for encoding the frame before. Accordingly, an extracting parameter to be produced must be able to control the extractor 130 to allocate a smaller bit-rate to the frame. For example, a bit-rate merely able to analyse the base layer BL would be allocated to the frame and the surplus bit-rate would be reserved to be allocated to other layers, i.e., the enhancement layers EL1-ELn, so that other layers requiring larger bit-rates can achieve the optimum frame quality.

If the adapter 110 has revealed by detection the block size in the frame (for example, a human face frame) is relatively small, it indicates that the frame was considered as a frame with a higher resolution for encoding the frame before. Accordingly, an extracting parameter to be produced must be able to control the extractor 130 to allocate a larger bit-rate to the frame, and if the ready bit-rate is not sufficient, the surplus bit-rates initially assigned to other layers allow to be transferred. In this way, the frame after the allocation has a sufficient bit-rate competent not only for analysing the block size and suiting the base layer BL, but also for analysing the enhancement layers El1-ELn in addition to the base layer BL.

Assuming the parameter of the bitstream is, for example, motion vector, if the adapter 110 has revealed by detecting the motion vector in the video sequence (for example, a news video sequence) is relatively small, it indicates the video sequence was considered as a video sequence with a low mobility for encoding the video sequence (a low frequency video corresponding to a lower mobility) before. Accordingly, an extracting parameter to be produced must be able to control the extractor 130 to allocate a smaller bit-rate to the video sequence. For example, a bit-rate merely able to analyse the motion vector and suiting the base layer BL would be allocated to the video sequence and the surplus bit-rate would be reserved to be allocated to other layers, i.e., the enhancement layers EL1-ELn, so that other layers requiring larger bit-rates can achieve the optimum video sequence quality.

If the adapter 110 has revealed by detecting the motion vector in the video sequence (for example, an American football video sequence) is relatively large, it indicates the video sequence was considered as a video sequence with a higher mobility for encoding the video sequence before. Accordingly, an extracting parameter to be produced must be able to control the extractor 130 to allocate a larger bit-rate to the video sequence, and if the ready bit-rate is not sufficient, the surplus bit-rates initially assigned to other layers allow to be transferred. In this way, the video sequence after the allocation has a sufficient bit-rate competent not only for analysing the motion vector and suiting the base layer BL, but also for analysing the enhancement layers El1-ELn in addition to the base layer.

Figure 3:
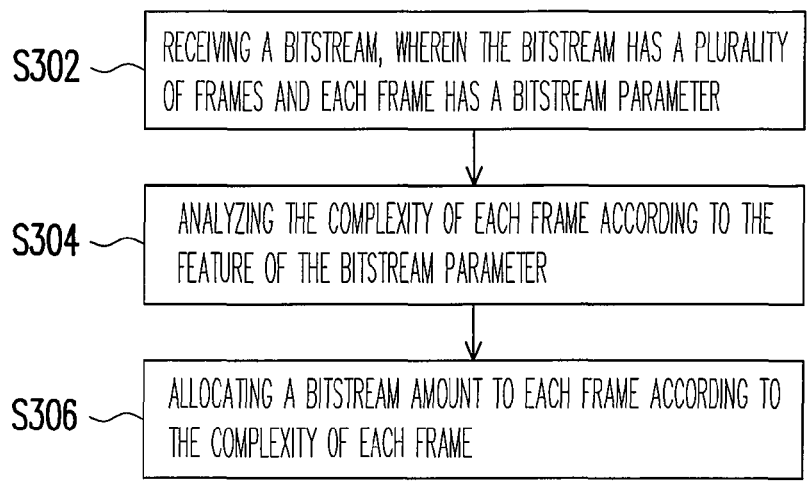
FIG. 3 is a flowchart of the method for allocating a bitstream according to an embodiment of the present invention.

From the above-described implementation cases an operation flow of a method for allocating an SVC bitstream can be summarized as follows. FIG. 3 is a flowchart of the method for allocating a bitstream according to an embodiment of the present invention. Referring to FIG. 3, first in step S302, a bitstream is received, wherein the bitstream has a plurality of video sequences and each video sequence has at least a bitstream parameter. Next in step S304, the complexity (for example, the proportion of the bitstream parameter occupied in the video sequence) of each video sequence is analysed according to the features of the bitstream parameters. Then in step S306, a bitstream amount is allocated to each video sequence according to the complexity thereof. When the complexity of a video sequence is relatively low through the analysis, a smaller bitstream amount (a smaller bit-rate) is provided to the video sequence so as to reserve and provide the surplus bitstream amount to the video sequences with a higher complexity. When the complexity of a video sequence is relatively high through the analysis, a larger bitstream amount (a larger bit-rate) is provided to the video sequence so as to enhance the video sequence quality. In this way, a limited bandwidth is able to be used more reasonably to make the video sequences achieve better video sequence quality according to the present invention.

In the following, an embodiment is depicted to explain the allocation approach of a bitstream. It is assumed that a bitstream includes a plurality of groups of pictures, for example but the present invention is not limited thereto, four groups of pictures GOP1-GOP4 and the bitstream has a total bit-rate (bandwidth) of, for example, 500 Kbps.

The numbers of all motion vectors MV and the sizes of each motion vector MV in GOP1-GOP4 are respectively obtained by statistics, wherein the statistics is focused on a criteria that whether or not any motion vector MVi in a group of pictures GOP has a size of larger than 10 pixels (marked by MVi>10 pixels). The statistics result is shown as follows:

GOP1: the sample number of MV1>10 pixels takes 80%, i.e., the total number of each the MV having a size larger than 10 pixels in all the frames of GOP1 takes 80% of GOP1 in whole.

GOP2: the sample number of MV2>10 pixels takes 40%, i.e., the total number of each the MV having a size larger than 10 pixels in all the frames of GOP1 takes 40% of GOP1 in whole.

GOP3: the sample number of MV3>10 pixels takes 10%, i.e., the total number of each the MV having a size larger than 10 pixels in all the frames of GOP1 takes 10% of GOP1 in whole.

GOP4: the sample number of MV4>10 pixels takes 70%, i.e., the total number of each the MV having a size larger than 10 pixels in all the frames of GOP1 takes 70% of GOP1 in whole.

After completing the statistics, an algorithm provided by the present invention is used to calculate the bit-rate of each frame that the required bit-rate of each frame is equal to the arithmetic result of the proportion of the motion vectors in each frame timing the bandwidth of the bitstream and being divided by the sum of all the proportions of Mvi>10 pixels in each frame, wherein the arithmetic equation is shown as follows:

$$GOPi\_bit-rate = \frac{MVi}{\sum_{i=1}^{k} MVi} \times total \cdot bit-rate,$$

wherein k represents the total number of GOPi. After that, the required bit-rates of GOP1-GOP4 are calculated as follows (K herein is the short for Kbps):

$$GOP1\_bit-rate = \frac{80\%}{80\% + 40\% + 10\% + 70\%} \times 500 \text{ K} = 200 \text{ K}$$

$$GOP2\_bit-rate = \frac{80\%}{80\% - 40\% + 10\% + 70\%} \times 500 \text{ K} = 100 \text{ K}$$

$$GOP3\_bit-rate = \frac{80\%}{80\% + 40\% + 10\% + 70\%} \times 500 \text{ K} = 25 \text{ K}$$

$$GOP4\_bit-rate = \frac{80\%}{80\% + 40\% + 10\% + 70\%} \times 500 \text{ K} = 175 \text{ K}$$

It can be seen from the above-mentioned result that the allocated bit-rate of GOP1 is 200 Kbps, the allocated bit-rate of GOP2 is 100 Kbps, the allocated bit-rate of GOP3 is 25 Kbps and the allocated bit-rate of GOP4 is 175 Kbps. In this way, the bitstream allocation system 100 provided by the present invention is able to allocate different bit-rates based on a limited bandwidth for each frame according to the features of the bitstream parameters of MV in GOP1-GOP4, so that a better frame quality can be achieved and a degraded frame quality for some of the frames in the prior art where every frame receives a same assigned bitstream amount (a same bandwidth) can be avoided.

In addition, if a bitstream parameter is a quantification parameter QP or a block size BS, the corresponding procedure can be derived from the above-described explanation and is saved herein for simplicity. The algorithm corresponding to the quantification parameter QP is that the required bit-rate of each frame is equal to the arithmetic result of the proportion of the quantification parameter in each frame timing the bandwidth of the bitstream and being divided by the sum of all the proportions of the quantification parameter in each frame, wherein the arithmetic equation is shown as follows:

$$GOPi\_bit-rate = \frac{QPi}{\sum_{i=1}^{k} QPi} \times total \cdot bit-rate,$$

wherein k represents the total number of GOPi. The algorithm corresponding to the block size BS is that the required bit-rate of each frame is equal to the arithmetic result of the proportion of the block size in each frame timing the bandwidth of the bitstream and being divided by the sum of all the proportions of the block size in each frame, wherein the arithmetic equation is shown as follows:

$$GOPi\_bit-rate = \frac{BSi}{\sum_{i=1}^{k} BSi} \times total \cdot bit-rate,$$

wherein k represents the total number of GOPi.

In the above description, the bitstream amount (bit-rate) of each group of picture (or each frame) in the bitstream is allocated and extracted is based on, for example, respectively detecting the feature of single bitstream parameter, which the present invention is not limited thereto. In fact, the present invention can allocate a bitstream amount to each frame in the bitstream according to two or more than two bitstream parameters, which can be seen from another embodiment described as follows.

In the embodiment, a user determines the sequence for processing each bitstream parameter to adjust the bitstream amount of the bitstream according to a practical need. In the embodiment, it is assumed the judgement sequence of the bitstream parameters is the motion vector MV first and then the quantification parameter QP; but the present invention does not limit the judgement sequence. In addition, the number of GOPs and the total bit-rate of the bitstream are assumed to be the same as the above-described embodiment; so that the allocated bit-rates are respectively 200 Kbps for GOP1, 100 Kbps for GOP2, 25 Kbps for GOP3 and 175 Kbps for GOP4.

For depiction simplicity, GOP1 is exemplarily explained. In the embodiment, GOP1 has eight frames, marked by PIC1-PIC8. In the embodiment, QP ranges 0-56 and QP<28 is the criteria to judge the QP occupation rate in each frame. The statistics result for the frames PIC1-PIC8 is listed as follows:

PIC1: QP1<28, having an occupation rate of 50%.

PIC2: QP2<28, having an occupation rate of 80%.
PIC3: QP3<28, having an occupation rate of 60%.
PIC4: QP4<28, having an occupation rate of 70%.
PIC5: QP5<28, having an occupation rate of 50%.
PIC6: QP6<28, having an occupation rate of 40%.
PIC7: QP7<28, having an occupation rate of 40%.
PIC8: QP8<28, having an occupation rate of 60%.

After completing the statistics, an algorithm provided by the present invention is used to obtain the bit-rates:

$$PICi\_bit-rate = \frac{QPi}{\sum_{i=1}^{k} QPi} \times total \cdot bit - rate,$$

wherein k represents the total number of the pictures PICi. After that, the required bit-rates of PIC1-PIC8 are calculated as follows (only the results for PIC1 and PIC2 are shown herein):

$$PIC1\_bit\_rate = \frac{50\%}{50\% + 80\% + 60\% + 70\% + 50\% + 40\% + 40\% + 60\%} \times 200 \text{ K} = 22 \text{ K}$$

$$PIC2\_bit\_rate = \frac{80\%}{50\% + 80\% + 60\% + 70\% + 50\% + 40\% + 40\% + 60\%} \times 200 \text{ K} = 35 \text{ K}$$

It can be seen from the above result that the allocated bit-rate for PIC1 is 22 Kbps and the allocated bit-rate for PIC2 is 35 Kbps. In this way, the present invention is able to allocate different bit-rates according to the features of the bitstream parameters of QP, so that a better frame quality of each frame can be achieved based on a limited bandwidth and a degraded frame quality for some of the frames in the prior art where every frame receives a same assigned bitstream amount (a same bandwidth) can be avoided.

If the detected proportion for MVi>10 pixels is too low in the embodiment, only the MV-oriented bit-rate is provided to the base layer BL and the surplus bit-rate is reserved for sharing with the last layer; that is to say the surplus bit-rate is used to enhance the QP-oriented enhancement layers.

Figure 4:
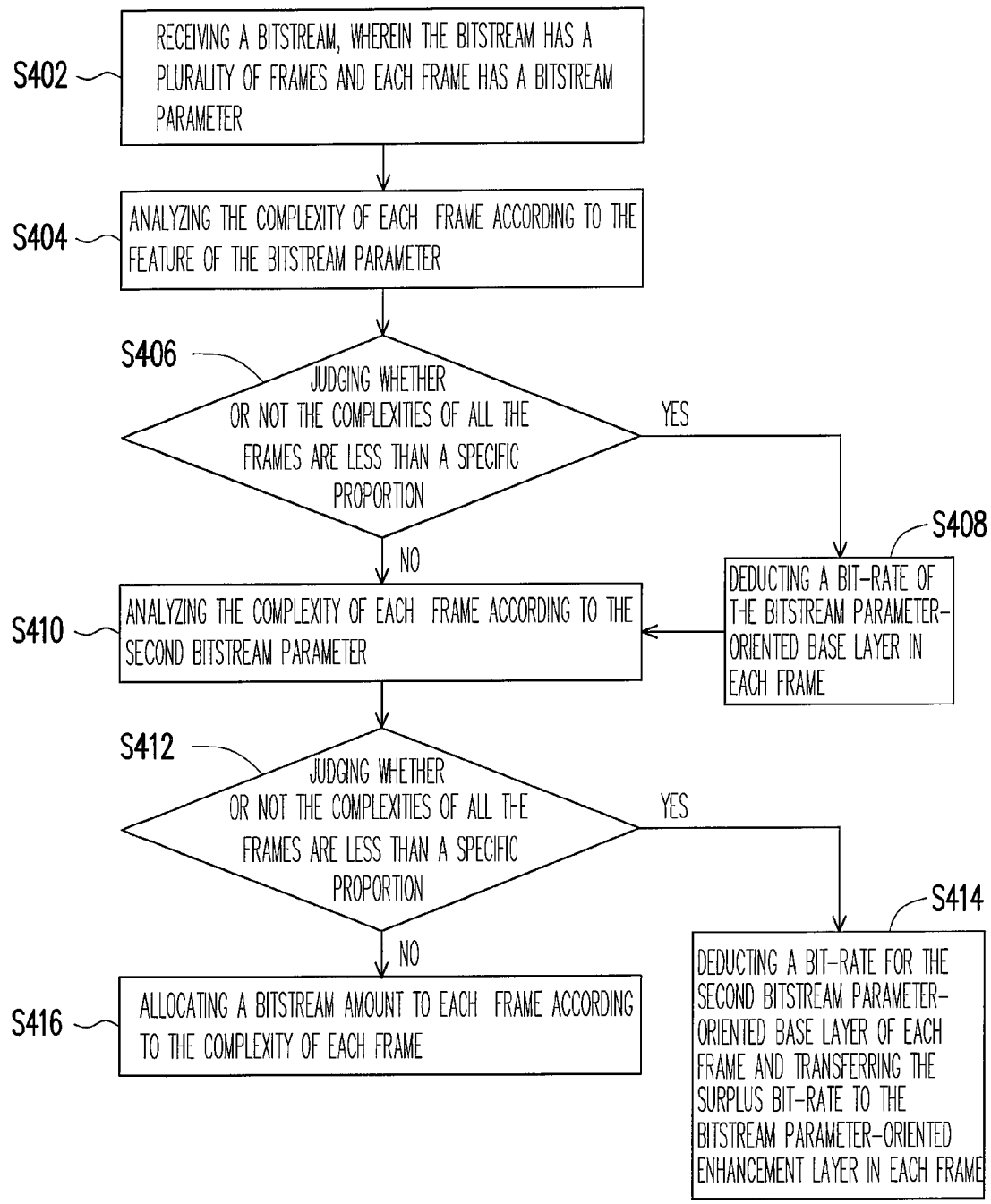
FIG. 4 is a flowchart of the method for allocating a bitstream according to another embodiment of the present invention.

From the above-described implementation, an operation flow of another method for allocating an SVC bitstream can be summarized as follows. FIG. 4 is a flowchart of the method for allocating a bitstream according to another embodiment of the present invention. Referring to FIG. 4, first in step S402, a bitstream is received, wherein the bitstream has a plurality of frames and each frame has a plurality of bitstream parameters. Next in step S404, the complexity (for example, the proportion of the bitstream parameter occupied in each frame) of each frame is analysed according to the features of the bitstream parameters.

Then in step S406, it is judged whether or not the complexities of all the frames are less than a specific proportion. In the embodiment, the specific proportion is defined by the user himself, for example, 10% is defined as the criteria to decide whether or not to allocate a bit-rate to the bitstream parameter-oriented base layer.

If the complexities of all the frames are less than the specific proportion, just by following step S408, a bit-rate of the bitstream parameter-oriented base layer in each frame is deducted from the total available bit-rate, and the surplus bit-rate of the total bit-rate is transferred to the second layer for use, i.e., to enhance the second bitstream parameter-oriented enhancement layers.

Further in step S410, the complexity of each frame is analyzed according to the second bitstream parameter. Then in step S412, it is judged whether or not the complexity of every frame is less than a specific proportion, for example, 10%, which would serve as the criteria to decide whether or not only the bit-rate for the second bitstream parameter-oriented base layer is allocated.

If all the complexities of all the frames are less than the specific proportion, just by following step S414, a bit-rate for the second bitstream parameter-oriented base layer of each frame is deducted from the total available bit-rate, and the surplus bit-rate of the total bit-rate is transferred to the first layer for use, i.e., to enhance the bitstream parameter-oriented enhancement layer.

In other words, if none of the complexities of all the frames is less than the specific proportion, the procedure enters step S416, and a bandwidth is respectively allocated to each frame according to the complexity of each frame.

After the above-mentioned step S406, if none of the complexities of all the frames is less than the specific proportion, the procedure directly enters into step S410 where the second bitstream parameter is used to conduct an analysis on the complexity of each frame.

In the embodiment, the bitstream parameter and the second bitstream parameter can be respectively one of a motion vector, a quantification parameter and a block size, but the bitstream parameter must be different from the second bitstream parameter. That is to say, when the motion vector is chosen as the bitstream parameter, the second bitstream parameter must be one of the quantification parameter and the block size. The other modifications can be derived referring the above-mentioned explanation, and they are omitted for simplicity.

In addition, the present invention allows to simultaneously use three bitstream parameters to allocate the bitstream amount of a bitstream. Yet another embodiment is described as follows.

In the present embodiment, a user determines the sequence for processing each bitstream parameter depending on a practical need and adjusts the bitstream amount of the bitstream based on the sequence. For convenience, it is assumed the judgement sequence of the bitstream parameters is the motion vector MV first, then the quantification parameter QP and finally the block size BS; but the present invention does not limit the judgement sequence. And taking the frame PIC1 as an example herein; thus, a statistics on the block size of the frame PIC1 is conducted, wherein the occupation rates of three blocks of 4×4, 8×8 and 16×16 are obtained as follows:
BS=16×16, the occupation rate is 80%.
BS=8×8, the occupation rate is 15%.
BS=4×4, the occupation rate is 5%.

It can be seen that in the frame PIC1, the block size of 4×4 has 5% occupation rate only, which indicates the complexity of the frame PIC1 is low. Accordingly, the bit-rate is allocated to the BS-oriented spatial base layer of the frame PIC1 only, and the allocated block size is, for example, 12 Kbps. The surplus bit-rate herein (that is 22 Kbps-12 Kbps=10 Kbps) is totally transferred to the first layer for use so as to enhance the MV-oriented enhancement layers.

In the embodiment, if the proportion of MVi>10 pixels is too low, then, the bit-rate is allocated to MV-oriented base layer BL only, the surplus bit-rate is transferred to the rear two layers for enhancing the QP-oriented enhancement layer and the BS-oriented enhancement layer; if the proportion of QP<28 is too low, the bit-rate is allocated to the QP-oriented base layer BL only, the surplus bit-rate is totally transferred to the layer after the base layer BL for enhancing the BS-oriented base layer. In this way, all the frames can be adjusted to have the better frame quality by means of sharing the available total bit-rate.

Figure 5:
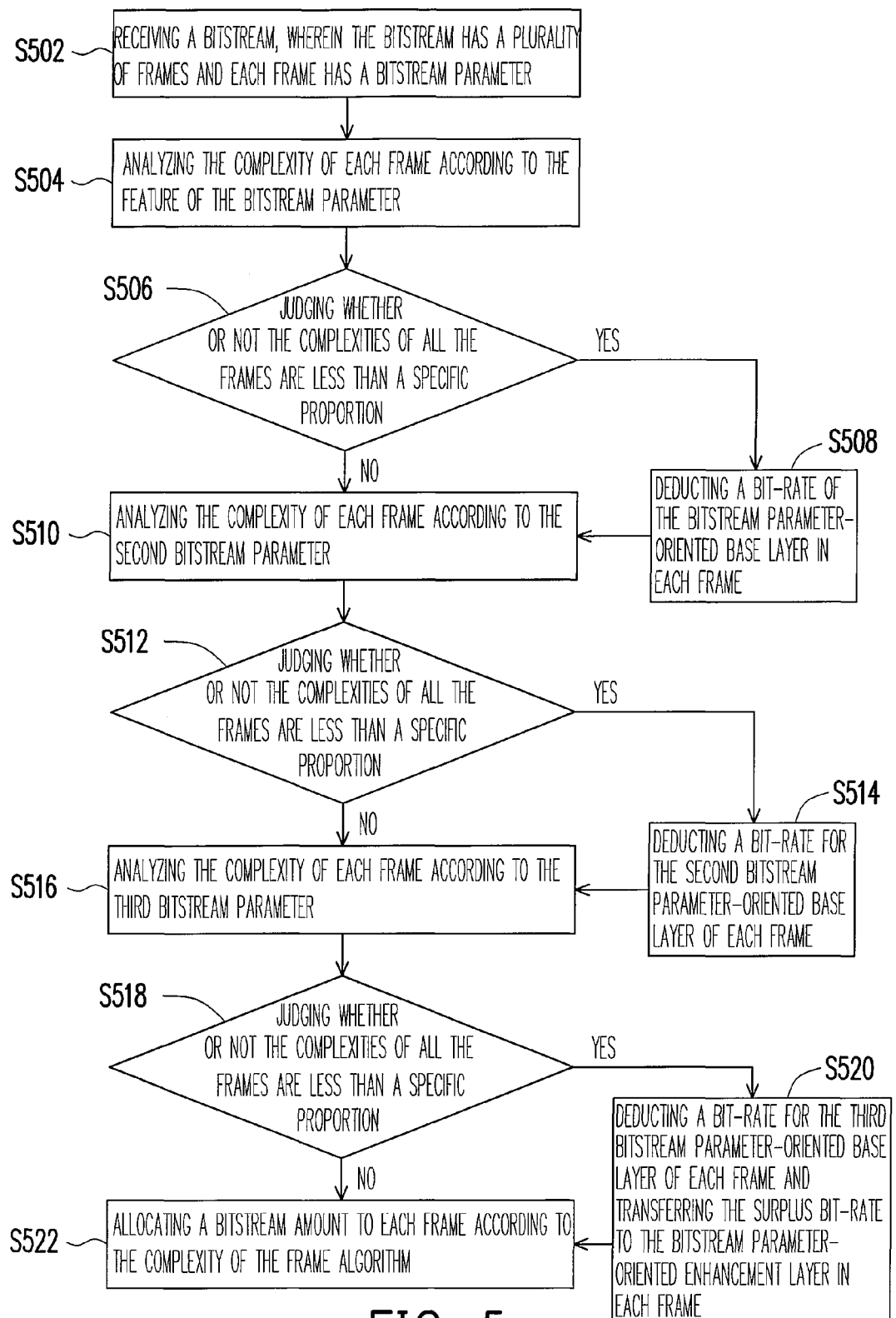
FIG. 5 is a flowchart of the method for allocating a bitstream according to yet another embodiment of the present invention.

From the above-described implementation an operation flow of yet another method for allocating an SVC bitstream can be summarized as follows. FIG. 5 is a flowchart of the method for allocating a bitstream according to yet another embodiment of the present invention. Referring to FIG. 5, first in step S502, a bitstream is received, wherein the bitstream has a plurality of frames and each frame has a plurality of bitstream parameters. Next in step S504, the complexity (for example, the proportion of the bitstream parameter occupied in each frame) of each frame is analysed according to the features of the bitstream parameters.

Then in step S506, it is judged whether or not the complexities of all the frames are less than a specific proportion. In the embodiment, the specific proportion is defined by the user himself, for example, 10% is defined as the criteria to decide whether or not to allocate a bit-rate to the bitstream parameter-oriented base layer.

If the complexities of all the frames are less than the specific proportion, just following step S508, a bit-rate of the bitstream parameter-oriented base layer in each frame is deducted from the total available bit-rate, and the surplus bit-rate of the total bit-rate is transferred to the rear two layers, i.e., to enhance the second bitstream parameter-oriented enhancement layer and the third bitstream parameter-oriented enhancement layer.

Further in step S510, the complexity of each frame is analyzed according to the second bitstream parameter. After completing the analysis of the complexity of each frame, the procedure enters into step S512, where it is judged whether or not the complexities of all the frames are less than a specific proportion, for example, 10%, which would serve as the criteria to decide whether or not only the bit-rate for the second bitstream parameter-oriented base layer is allocated.

If the complexities of all the frames are less than the specific proportion, just by following step S514, a bit-rate for the second bitstream parameter-oriented base layer for each frame is deducted from the total available bit-rate, and the surplus bit-rate of the total bit-rate is transferred to the first layer for use, i.e., to enhance the third bitstream parameter-oriented enhancement layer.

Further in step S516, the complexity of each frame is analyzed according to the third bitstream parameter and thereafter, the procedure enters into step S518, where it is judged that whether or not the complexities of all the frames are less than a specific proportion, for example, 10% so as to decide whether or not a bit-rate is allocated to the third bitstream parameter-oriented base layer only.

If the complexities of all the frames are less than the specific proportion, just following step S520, a bit-rate for a third bitstream parameter-oriented base layer of each frame is deducted from the total available bit-rate, and the surplus bit-rate of the total bit-rate is transferred to the bitstream parameter-oriented enhancement layer of each frame for use.

In other words, if none of the complexities of all the frames is less than the specific proportion, just following step S522, a bandwidth is allocated to each frame based on the complexity of the frame.

In addition, in step S506, if none of the complexities of all the frames is less than the specific proportion, just by directly entering step S510, the second bitstream parameter is used to conduct an analysis on the complexity of each frame. In step S512, if none of the complexities of all the frames is less than the specific proportion, just by directly entering step S516, the third bitstream parameter is used to conduct an analysis on the complexity of each frame.

In the embodiment, the bitstream parameter, the second bitstream parameter and the third bitstream parameter can be respectively one of a motion vector, a quantification parameter and a block size; but the bitstream parameter, the second bitstream parameter and the third bitstream parameter are different from each other. In other words, if the bitstream parameter chooses the motion vector and the second bitstream parameter chooses the quantification parameter, then, the third bitstream parameter is allowed to choose a parameter which the bitstream parameter and the second bitstream parameter do not use; for example, the third bitstream parameter can choose the block size. The other choosing schemes are allowed depending on the user, which is omitted herein for simplicity.

In the following, an experimental result of the present embodiment is given, wherein the experiment is conducted in an environment with an H.264/SVC decoding terminal, and a bitstream in common intermediate format (CIF) is tested. The result of the embodiment herein is compared with the result by using the reference code compiled with JSVM (joint scalable video model) of ISO (the International Standards Organization) so as to evaluate the uniformity of allocating bandwidths according to JVSM and dynamically allocating bandwidths according to the present embodiment. The experimental results are listed in Tables 1 and 2, from which it can be seen that the present invention certainly promotes the quality of frames.

TABLE 1 shows the Experimental Results of Allocating Bandwidths to a CIF Bitstream under Forman Model

| bit-rate (bps) | JVSM | the present embodiment |
| --- | --- | --- |
| 400K~600K | 28.26 dB | 31.55 dB |
| 600K~800K | 31.33 dB | 36.14 dB |
| 800K~1000K | 37.89 dB | 38.92 dB |
| 1000K~1200K | 41.26 dB | 41.26 dB |

TABLE 2 shows the Experimental Results of Allocating Bandwidths to a CIF Bitstream under Akiyo Model

| bit-rate (bps) | JVSM | the present embodiment |
| --- | --- | --- |
| 400K~600K | 33.19 dB | 37.85 dB |
| 600K~800K | 37.57 dB | 40.46 dB |
| 800K~1000K | 42.64 dB | 44.57 dB |
| 1000K~1200K | 45.28 dB | 45.28 dB |

In summary, the present invention detects the features of bitstream parameters and respectively allocates different bitstream amount to each frame to make each frame achieve the optimum feature according to the above-mentioned detection results. In this way, the present invention is not only able to avoid poor frame quality due to insufficient assigned bitstream amount, but also to dynamically share the bitstream amount between each frame by means of the features of the bitstream parameters, so that each frame receives a bandwidth required to analyze data, and thereby, the present invention is able to achieve the maximum usage efficiency of bandwidth.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A system for allocating a bitstream of scalable video coding, comprising:
an adapter, receiving a bitstream of a video encoder and producing an extracting parameter of the bitstream according to the feature of at least a bitstream parameter in the bitstream content; and
an extractor, extracting and allocating the bitstream according to the extracting parameter,
wherein the bitstream parameter is one of a quantification parameter, a block size and a motion vector or a combination thereof,
wherein the bitstream has a multi-layers architecture and the bitstream parameter is a quantification parameter,
if the adapter reveals by detecting the value of the quantification parameter in the bitstream is relatively large, a relatively small bit-rate is allocated to the group of pictures and the surplus bit-rate is allocated to other layers; and if the adapter reveals by detecting the value of the quantification parameter in the bitstream is relatively small, a relatively large bit-rate is allocated to the group of pictures and the bit-rate shortage is extracted from other layers.

2. A system for allocating a bitstream of scalable video coding, comprising:
an adapter, receiving a bitstream of a video encoder and producing an extracting parameter of the bitstream according to the feature of at least a bitstream parameter in the bitstream content; and
an extractor, extracting and allocating the bitstream according to the extracting parameter,
wherein the bitstream parameter is one of a quantification parameter, a block size and a motion vector or a combination thereof,
wherein the bitstream has a multi-layers architecture and the bitstream parameter is a block size,
if the adapter reveals by detecting the block size in the bitstream is relatively large, a relatively small bit-rate is allocated to the group of pictures and the surplus bit-rate is allocated to other layers; and if the adapter reveals by detecting the block size in the bitstream is relatively small, a relatively large bit-rate is allocated to the group of pictures and the bit-rate shortage is extracted from other layers.

3. A system for allocating a bitstream of scalable video coding, comprising:
an adapter, receiving a bitstream of a video encoder and producing an extracting parameter of the bitstream according to the feature of at least a bitstream parameter in the bitstream content; and
an extractor, extracting and allocating the bitstream according to the extracting parameter,
wherein the bitstream parameter is one of a quantification parameter, a block size and a motion vector or a combination thereof,
wherein the bitstream has a multi-layers architecture and the bitstream parameter is a motion vector;
if the adapter reveals by detecting the motion vector in the bitstream is relatively small, a relatively small bit-rate is allocated to the group of pictures and the surplus bit-rate is allocated to other layers; and if the adapter reveals by detection the value of the motion vector in the bitstream is relatively large, a relatively large bit-rate is allocated to the group of pictures and the bit-rate shortage is extracted from other layers.

4. A method for allocating a bitstream of scalable video coding, comprising:
receiving a bitstream comprising a plurality of frames, wherein each frame comprises a bitstream parameter;
analyzing the complexity of each of the frames according to the feature of the bitstream parameter; and
allocating a bitstream amount to each of the frames according to the complexity of each of the frames, wherein the bitstream parameter is one of a motion vector, a quantification parameter and a block size,
wherein if the bitstream parameter is a motion vector, the step of analyzing the complexity of each of the frames comprises a first algorithm, and the first algorithm is the bit-rate of each of the frames=(the proportion occupied by the motion vectors of each frame/the sum of the proportions occupied by the motion vectors in each frame)×(the bandwidth of the bitstream).

5. A method for allocating a bitstream of scalable video coding, comprising:
receiving a bitstream comprising a plurality of frames, wherein each frame comprises a bitstream parameter;
analyzing the complexity of each of the frames according to the feature of the bitstream parameter; and
allocating a bitstream amount to each of the frames according to the complexity of each of the frames, wherein the bitstream parameter is one of a motion vector, a quantification parameter and a block size,
wherein if the bitstream parameter is a quantification parameter, the step of analyzing the complexity of each of the frames comprises a first algorithm, and the first algorithm is the bit-rate of each of the frames=(the proportion occupied by the quantification parameters of each frame/the sum of the proportions occupied by the quantification parameters in each frame)×(the bandwidth of the bitstream).

6. A method for allocating a bitstream of scalable video coding, comprising:
receiving a bitstream comprising a plurality of frames, wherein each frame comprises a bitstream parameter;
analyzing the complexity of each of the frames according to the feature of the bitstream parameter; and
allocating a bitstream amount to each of the frames according to the complexity of each of the frames, wherein the bitstream parameter is one of a motion vector, a quantification parameter and a block size,
wherein if the bitstream parameter is a block size, the step of analyzing the complexity of each of the frames comprises a first algorithm, and the first algorithm is the bit-rate of each of the frames=(the proportion occupied by the block sizes of each frame/the sum of the proportions occupied by the block sizes in each frame)×(the bandwidth of the bitstream).

7. A method for allocating a bitstream of scalable video coding, comprising:
receiving a bitstream comprising a plurality of frames, wherein each frame comprises a bitstream parameter;
analyzing the complexity of each of the frames according to the feature of the bitstream parameter; and
allocating a bitstream amount to each of the frames according to the complexity of each of the frames,
wherein each frame further comprises a second bitstream parameter, and the method after the step of analyzing the complexity of each of the frames further comprises:

judging whether or not the complexities of all the frames are less than a specific proportion;

deducting the bit-rate of a base layer oriented by the bitstream parameter in each of the frames when the complexities of all the frames are less than the specific proportion; and analyzing the complexity of each frame according to the second bitstream parameter.

8. The method for allocating a bitstream of scalable video coding according to claim 7, wherein the step of judging whether or not the complexities of all the frames are less than the specific proportion further comprises:

directly entering into a step of analyzing the complexity of each of the frames according to the second bitstream parameter when none of the complexities of all the frames is less than the specific proportion.

9. The method for allocating a bitstream of scalable video coding according to claim 7, wherein after the step of analyzing the complexity of each of the frames according to the second bitstream parameter, the method further comprises:

judging whether or not the complexities of all the frames are less than the specific proportion;

deducting the bit-rate of a base layer oriented by the second bitstream parameter in each of the frames and transferring the surplus bit-rate to an enhancement layer oriented by the bitstream parameter in each of the frames when the complexities of all the frames are less than the specific proportion; and directly entering into the step of allocating a bitstream amount to each of the frames according to the complexity of each frame when none of the complexities of all the frames is less than the specific proportion.

10. The method for allocating a bitstream of scalable video coding according to claim 7, wherein the bitstream parameter and the second bitstream parameter are respectively one of a motion vector, a quantification parameter and a block size, and the bitstream parameter and the second bitstream parameter are different from each other.

11. The method for allocating a bitstream of scalable video coding according to claim 7, wherein each frame further has a third bitstream parameter, and the method after the step of analyzing the complexity of each of the frames further comprises:

judging whether or not the complexities of all the frames are less than a specific proportion;

deducting the bit-rate of a base layer oriented by the second bitstream parameter in each of the frames when the complexities of all the frames are less than the specific proportion; and analyzing the complexity of each frame according to the third bitstream parameter.

12. The method for allocating a bitstream of scalable video coding according to claim 11, wherein the step of judging whether or not the complexities of all the frames are less than the specific proportion further comprises:

directly entering into a step of analyzing the complexity of each of the frames according to the third bitstream parameter when none of the complexities of all the frames is less than the specific proportion.

13. The method for allocating a bitstream of scalable video coding according to claim 11, wherein after the step of analyzing the complexity of each of the frames according to the third bitstream parameter, the method further comprises:

judging whether or not the complexities of all the frames are less than the specific proportion;

deducting the bit-rate of a base layer oriented by the third bitstream parameter in each of the frames and transferring the surplus bit-rate to an enhancement layer oriented by the bitstream parameter in each of the frames when the complexities of all the frames are less than the specific proportion; and directly entering the step of allocating a bitstream amount to each of the frames according to the complexity of each frame when none of the complexities of all the frames is less than the specific proportion.

14. The method for allocating a bitstream of scalable video coding according to claim 11, wherein the bitstream parameter, the second bitstream parameter and the third bitstream parameter are respectively one of a motion vector, a quantification parameter and a block size, and the bitstream parameter, the second bitstream parameter and the third bitstream parameter are different from each other.

* * * * *